(12) United States Patent
Boyd et al.

(10) Patent No.: US 7,329,379 B2
(45) Date of Patent: *Feb. 12, 2008

(54) METHOD FOR SOLID FREEFORM FABRICATION OF A THREE-DIMENSIONAL OBJECT

(75) Inventors: Melissa D. Boyd, Corvallis, OR (US); Vladek Kasperchik, Corvallis, OR (US)

(73) Assignee: Hewlett-Packard Development Company, LP., Houston, TX (US)

( * ) Notice: Subject to any disclaimer, the term of this patent is extended or adjusted under 35 U.S.C. 154(b) by 400 days.

This patent is subject to a terminal disclaimer.

(21) Appl. No.: 10/701,885

(22) Filed: Nov. 4, 2003

(65) Prior Publication Data

US 2005/0093208 A1    May 5, 2005

(51) Int. Cl.
*B29C 35/08* (2006.01)
*B29C 41/02* (2006.01)

(52) U.S. Cl. ............... 264/401; 264/442; 264/494; 264/496; 264/497

(58) Field of Classification Search ............... 264/401, 264/442, 494, 496, 497
See application file for complete search history.

(56) References Cited

U.S. PATENT DOCUMENTS

| | | | |
|---|---|---|---|
| 6,572,807 B1 | 6/2003 | Fong | |
| 7,120,512 B2 * | 10/2006 | Kramer et al. | 700/119 |
| 2004/0036200 A1 * | 2/2004 | Patel et al. | 264/401 |
| 2004/0099983 A1 * | 5/2004 | Dirscherl | 264/317 X |
| 2004/0145088 A1 * | 7/2004 | Patel et al. | 264/494 X |
| 2004/0207123 A1 * | 10/2004 | Patel et al. | 264/401 |
| 2005/0012247 A1 * | 1/2005 | Kramer et al. | 264/401 |

* cited by examiner

*Primary Examiner*—Leo B. Tentoni

(57) ABSTRACT

A method for creating a three-dimensional solid freeform fabrication object with phase-change material includes depositing a bulk amount of phase-change material in a defined region, selectively ink-jetting an ultraviolet initiator onto a predetermined area of the phase-change material, wherein the ultraviolet initiator defines a cross-sectional area of the three-dimensional object, and exposing the ultraviolet initiator to an ultraviolet light to cause cross-linking of the defined region.

29 Claims, 10 Drawing Sheets

METHOD FOR SOLID FREEFORM FABRICATION OF A THREE-DIMENSIONAL OBJECT

BACKGROUND

The efficient production of prototype three-dimensional compositions or objects can provide an effective means of reducing the time it takes to bring a product to market at a reasonable cost. A typical approach for preparing prototypes has required specific tooling, such as molds and dies, which can be a slow and cumbersome process.

Recently, computerized modeling has alleviated some of the need for building prototypes by providing a good idea of what a product will look like without a specialized tooling requirement. However, the fabrication of a tangible object is still often preferred for prototyping. The merging of computer modeling and the physical formation of three-dimensional objects is sometimes referred to as solid free-form fabrication.

Solid free-form fabrication (SFF) is a process whereby three-dimensional objects, for example, prototype parts, models, working tools, production parts, molds, and other articles are manufactured by sequentially depositing layers of a structural material. Computer aided design (CAD) is commonly used to automate the design process. Using a suitable computer, an operator may design a three-dimensional article and then create that object by employing a positionable ejection head that selectively emits structural material. Various techniques that employ SFF have been explored.

Traditional methods of forming SFF objects include using rapid jetted polymer systems, extrusion nozzles, and powder/binder based systems. All of these systems have decreased the time traditionally required to produce desired three-dimensional objects, yet the jetted and extrusion-based systems are still relatively slow processes due to the necessity of ejecting 100% of the build and support materials through selective dispensing nozzles. Additionally, material properties and surface finish are often compromised in existing methods due to material compositions and porosity created in the resulting three-dimensional objects. Moreover, the temporary materials required to support the structure during fabrication are often difficult to remove, require extra time and labor, and may cause variations in surface finish quality.

SUMMARY

A method for creating a three-dimensional solid freeform fabrication object with phase-change material includes depositing a bulk amount of phase-change material in a defined region, selectively ink-jetting an ultraviolet initiator onto a predetermined area of the phase-change material, wherein the ultraviolet initiator defines a cross-sectional area of the three-dimensional object, and exposing the ultraviolet initiator to an ultraviolet light to cause cross-linking of the defined region.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary method and apparatus for forming SFF articles through the bulk spreading of phase-change materials is described herein. More specifically, an exemplary additive fabrication process is presented that includes the bulk distribution of a phase-change material followed by the jetting of a UV initiator that facilitates selective cross-linking in the phase-change material thereby defining a desired three-dimensional object. Once the desired three-dimensional object is defined by the jetting of a UV initiator, the cross-linking may be initiated by the application of UV light. Non-cross-linked support material may then be removed through the application of thermal energy, resulting in a strong three-dimensional part and a simple and inexpensive method of support structure removal. The present specification discloses the composition of both exemplary phase-change materials and various exemplary methods that can be used to fabricate three-dimensional objects using phase-change materials.

As used in this specification and in the appended claims, the term "phase-change material" is meant to be understood broadly as any meltable material that exhibits differing flow properties at various temperatures. Additionally, the term "substrate" is meant to be understood as any build platform, removable material, or previously deposited phase-change material. A "build platform" is typically the rigid substrate that is used to support deposited material in an SFF apparatus. Moreover, the term "melting" is meant to be understood as any process configured to provide sufficient thermal energy to a solidified phase-change material to cause the material to flow and more readily be removed from a desired three-dimensional object.

In the following description, for purposes of explanation, numerous specific details are set forth in order to provide a thorough understanding of the present system and method for forming three-dimensional objects via bulk spreading of a phase-change material. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
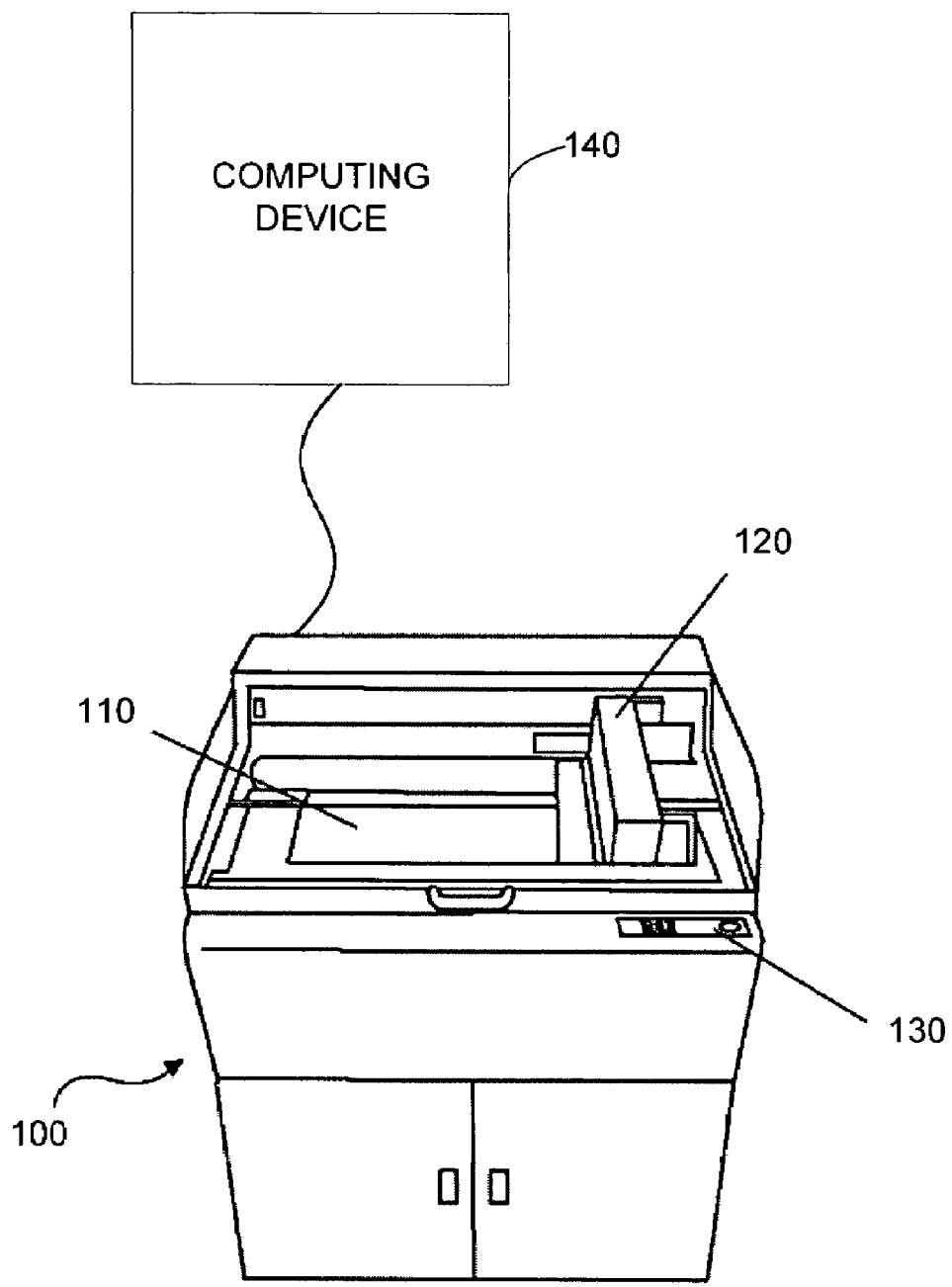
FIG. 1 is a perspective view of a solid freeform fabrication system that may be used to implement exemplary embodiments of the present system and method.

FIG. 1 illustrates an exemplary solid free-form fabrication (SFF) system (100) that may incorporate the present method of forming three-dimensional objects via the bulk spreading of phase-change material. As shown in FIG. 1, an exemplary solid free-form fabrication system (100) may include a fabrication bin (110), a moveable carriage (120), and a display panel (130) including a number of controls and displays. Additionally, a computing device (140) may be communicatively coupled to the SFF system (100).

The fabrication bin (110) shown in FIG. 1 may be configured to receive and facilitate the building of a desired three-dimensional object on a substrate. The building of the desired three-dimensional object may include the bulk deposition of a phase-change material in liquid form and the selective dispensing of a ultraviolet (UV) initiator into the phase-change material. While the SFF system (100) illustrated in FIG. 1 is shown as a single, stand-alone, self-contained SFF system, the present phase-change based SFF system and methods may be incorporated into any SFF system configured to apply phase-change material in bulk amounts, regardless of the structure or configuration of the SFF system.

The moveable carriage (120) of the SFF system (100) illustrated in FIG. 1 is a moveable material dispenser that may include any number of inkjet material dispensers configured to dispense a UV initiator or a phase-change material. The moveable carriage (120) may also include a number of spreaders (not shown) and levelers (not shown) to properly control the deposition height and the surface finish of a deposited phase change material. The moveable carriage (120) may be controlled by a computing device (140) and may be controllably moved by, for example, a shaft system, a belt system, a chain system, etc. As the moveable carriage (120) operates, the display panel (130) may inform a user of operating conditions as well as provide the user with a user interface.

As a desired three-dimensional object is formed, the computing device (140) may controllably position the moveable carriage (120) and direct one or more of the dispensers (not shown) to dispense a bulk quantity of liquid phase-change material and then to spread or level it to the desired layer thickness. Additionally, the computing device (140) may cause one or more dispensers (not shown) to controllably dispense a UV initiator at predetermined locations within the fabrication bin (110) thereby defining the desired three-dimensional object. The inkjet material dispensers used by the solid free-form fabrication system (100) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the ink-jet printhead dispenser can be heated to assist in dispensing the phase-change material or other viscous materials. A more demonstrative cross-sectional view of the SFF apparatus of FIG. 1 is presented in FIG. 2.

Figure 2:
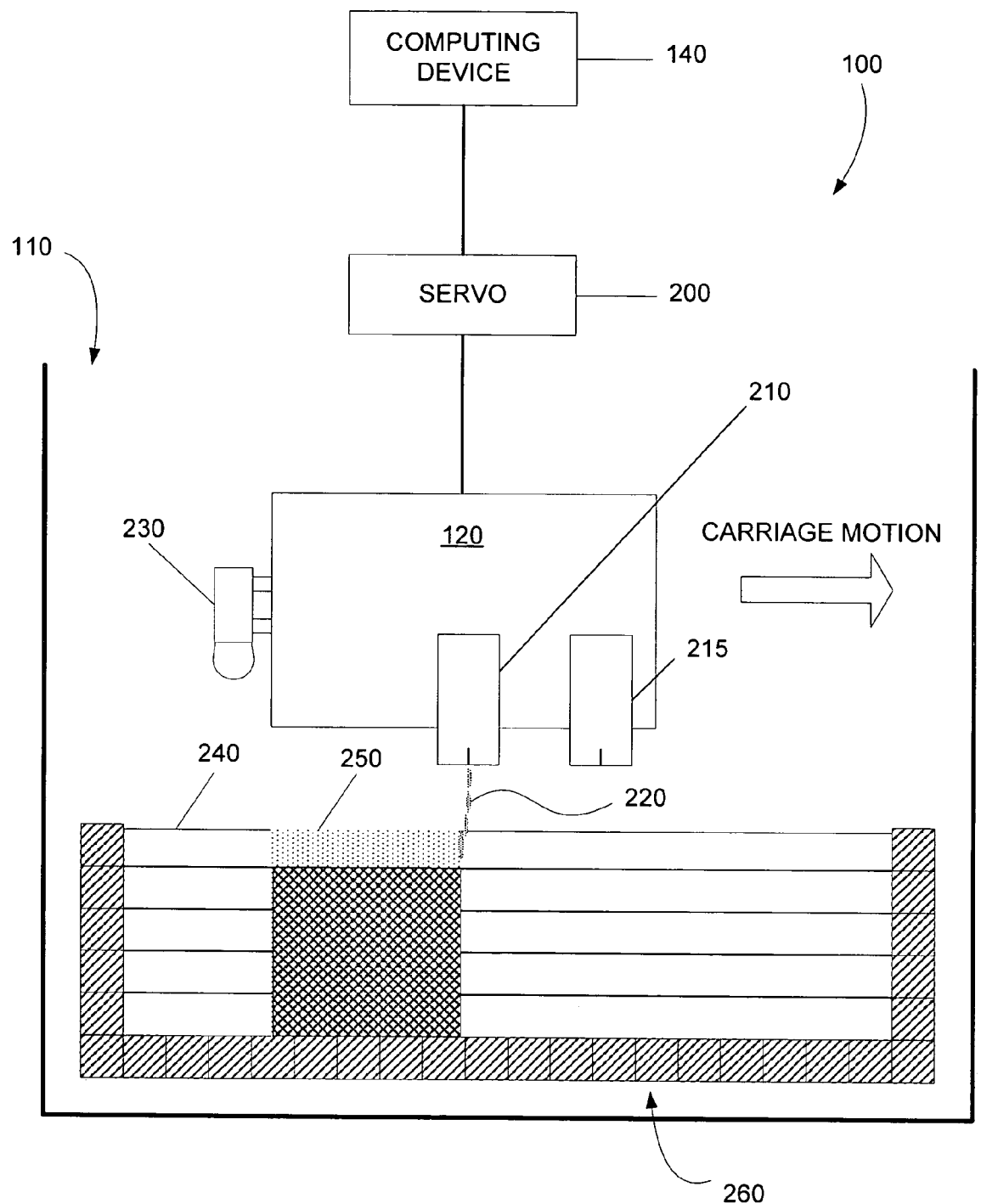
FIG. 2 is a cross-sectional view of a solid freeform fabrication system that may be used to implement exemplary embodiments of the present system and method.

As shown in FIG. 2, the computing device (140) may be communicatively coupled to a servo-mechanism (200). The computing device (140) may be configured to communicate commands to the servo-mechanism (200) causing it to selectively position the moveable carriage (120). FIG. 2 illustrates that the moveable carriage (120) may include an ultraviolet light (UV) radiation applicator (230), an initiator inkjet dispenser (210), and phase-change material inkjet dispenser (215).

The UV radiation applicator (230) illustrated in FIG. 2 may be any device configured to apply UV or other radiation energy sufficient to form a radical in a UV initiator used to initiate polymerization. As shown in FIG. 2, the UV radiation applicator (230) may be a scanning unit physically coupled to the moveable carriage (120). Alternatively, the UV radiation applicator (230) may be a separate light exposer or scanning unit configured to flood expose all or selective portions of the deposited phase-change material after a UV initiator has been deposited.

Additionally, according to one exemplary embodiment, one or more phase-change material inkjet dispensers (215) may be coupled to the moveable carriage (120) and to a number of phase-change material reservoirs (not shown). According to this exemplary embodiment, the phase-change material inkjet dispensers (215) are configured to dispense bulk quantities of phase-change material (240) according to rapid, non-selective techniques. Non-selective techniques may allow for more rapid dispensing of the phase-change material (240) by relaxing a number of quantity and positional tolerances. While the exemplary system illustrated in FIG. 2 is shown with a phase-change material inkjet dispenser (215), the liquid phase-change material (240) may be non-selectively dispensed in bulk quantities using any number of dispensing systems including, but in no way limited to, spraying, rolling, screen-printing, extrusion, or doctor-blading. Alternatively, the phase-change material may be applied in solid form as a powder or a sheet, and then heated to a liquid form after application. Such heating to a liquid form can take place either before or after the UV initiator is dispensed. The applied layer may be further modified before or after solidification through application of spreading and leveling devices, to provide a consistent layer thickness and surface quality. Spreading and leveling devices may for example include milling cutters, scraping blades, heated rollers, or other methods commonly used to flatten and level surfaces. Composition, interaction, and functions of the phase-change material (240) as well as a method for its use will be described in further detail below with reference to FIGS. 3 through 4E.

One or more initiator inkjet dispensers (210) configured to dispense a UV initiator may also be coupled to the moveable carriage (120) and to a number of UV initiator reservoirs (not shown). Once positioned by the servo-mechanism (200), the initiator inkjet dispenser (210) may selectively eject a UV initiator (220) supplied by the UV initiator material reservoirs. The UV initiator (220) that is stored in the UV initiator material reservoir (not shown) and supplied to the initiator inkjet dispenser (210) to be dispensed is selected with a "jettable" viscosity configured to be dispensed by any one of the inkjet dispensers mentioned above. The UV initiator (220) will be further described below with reference to the exemplary compositions.

FIG. 2 also illustrates the components of the present system that may be incorporated to receive the UV initiator (220) and the phase-change material (240) thereby aiding in the formation of a desired three-dimensional object. As shown in FIG. 2, the fabrication bin (110) of the SFF system (100) may include a substrate (260). As shown in FIG. 2, the substrate (260) may include a plurality of sides configured to retain a non-solid phase-change material during solidification. One such configuration consists of having the sides of the substrate (260) separate from the bottom, such that the bottom can be progressively lowered during the build process to keep the material receiving surface at a constant height. According to one exemplary embodiment, the phase-change material (240) may be dispensed layer-by-layer onto the substrate (260) in bulk liquid quantities from a phase-change material reservoir (not shown). The liquid phase-change material (240) may then be allowed to solidify on the substrate (260) before, during, and/or after the deposition of the UV initiator (220).

Once the UV initiator (220) is dispensed into, on top of, or under the layer of phase-change material (240), a mixture (250) of UV initiator (220) and phase-change material (240) exists on the substrate (260). The mixture (250) defines the desired three-dimensional object. The system and method for using the SFF system (100) illustrated in FIG. 2 will be described in detail below with reference to FIG. 3 through FIG. 4E.

Exemplary Compositions

One exemplary embodiment of the present system and method for forming three-dimensional objects via bulk spreading of phase-change material is based on employing a phase-change material (240) that selectively receives a UV initiator (220). The UV initiator may then be exposed to UV radiation, causing cross-linking to selectively occur within the phase-change material, thereby forming a desired three-dimensional object.

The phase-change material (240) that is first disposed on the substrate (260) in FIG. 2 receives the UV initiator (220) and forms the structural basis of the desired three-dimensional object. According to one exemplary embodiment, the phase-change material (240) disposed on the substrate (260) may include unsaturated monomers or oligomers containing one or more unsaturated functionalities.

According to one exemplary embodiment, the phase-change material (240) implemented by the present system and method has a higher than ambient melting temperature. Any unsaturated monomer or oligomer containing one or more unsaturated functionalities with a higher than ambient melting temperature may be used as the phase-change material (240) including, but in no way limited to, stearyl acrylate (melting temperature=24 degrees Celsius), cyclohexane dimethanol dimethacrylate (melting temperature =55-60 degrees Celsius), cyclohexane dimethanol diacrylate (melting temperature=75-80 degrees Celsius), tris (2-hydroxy Ethyl) isocyanurate triacrylate (melting temperature=52-54 degrees Celsius).

According to another exemplary embodiment, high-melting monomers and oligomers are mixed and plasticized with other polymerizable unsaturated species having a lower melting temperature as long as the resulting mixture forms a solid or otherwise preserves its shape at ambient temperature. Any number of liquid monomers or oligomers could be mixed into solid monomers or oligomers. According to one exemplary embodiment, commercially available acrylates and methacrylates or species containing both acrylic and urethane or epoxy functionality may be mixed into, and plasticized with, high-melting monomers and oligomers. Examples of commercially available acrylates and methacrylates or species containing both acrylic and urethane or epoxy functionality include, but are in no way limited to, isodecyl methacrylate, 2-phenoxyethyl acrylate, isobornyl acrylate, propylene glycol monomethacrylate, propylene glycol dimethacrylate, ethylene glycol dimethacrylate, 1,6-hexanediol dimethacrylate, urethane acrylates, epoxy acrylates, etc.

The UV initiator (220) that is selectively deposited on and received by the above-mentioned phase-change material (240) as illustrated in FIG. 2 is configured to define the desired three-dimensional object. The UV initiator (220) fosters cross-linking of the phase-change material (240), according to one exemplary embodiment, by absorbing UV radiation and producing a free radical. This free radical then facilitates the cross-linking of the phase-change material (240) through chain propagation.

Examples of the photo or UV initiators (220) which could be jetted into a top layer of a bulk spread phase-change material (240) include, but are in no way limited to, a variety of commercially available aromatic ketones and hydroxy ketones including, but in no way limited to benzyl dimethyl Ketal, Benzoin n-butyl ethers, trimethyl benzophenone, benzophenone, and alpha hydroxy ketone (Esacure KIP100F—as available from SARTOMER). While some of the above-mentioned UV initiators (220) are solids, they may be jetted by dissolving the UV initiators (220) in a carrier fluid such as a UV-curable monomer or oligomer.

If the phase-change build material (240) used contains a polymerizable epoxy functionality, for example cycloaliphatic diepoxides, a jettable cationic photoinitiator may be used as the UV initiator (220) to cross-link or otherwise cure the phase-change build material. Cationic photoinitiators that may be used by the present system and method include, but are in no way limited to, solutions of triaryl sulfonium hexafluoroantimonate, triaryl sulfonium hexafluorophosphate, diaryl iodonium hexafluorophosphate, etc.

Additionally, photoinitiator synergists may be added to the above-mentioned UV initiators (220) to improve the efficiency and curing speed. Exemplary photoinitiator synergists that may be added to the above-mentioned UV initiators (220) include, but are in no way limited to, reactive amine co-initiators including CN381, CN383, CN384, and CN386 provided by SARTOMER. Since the above-mentioned photoinitiator synergists tend to react with UV initiators (220), photoinitiator synergists should be dissolved or dispersed in the build material or otherwise separated from the UV initiators prior to the dispensing of the UV initiators (220).

Moreover, the UV initiator (220) is configured such that it may be dispensed by any number of inkjet print heads including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc.

According to one exemplary embodiment, a dye or other colorant may be added to the UV initiator (220). According to this exemplary embodiment, one or more ink reservoirs (not shown) may provide one or more initiator inkjet dispensers (210) with a dyed UV initiator (220), making a full color SFF system possible.

While the above paragraphs illustrate a number of possible chemistries that may be used to form a UV initiator (220) and a phase-change material (240) to be used for the production of three-dimensional objects, cure rate and dispersion of the UV initiator may be altered by varying the chemistry and percentages of the above-mentioned components. Exemplary embodiments for using the above-mentioned structure and compositions will now be explained in detail below.

Exemplary Implementation and Operation

Figure 3:
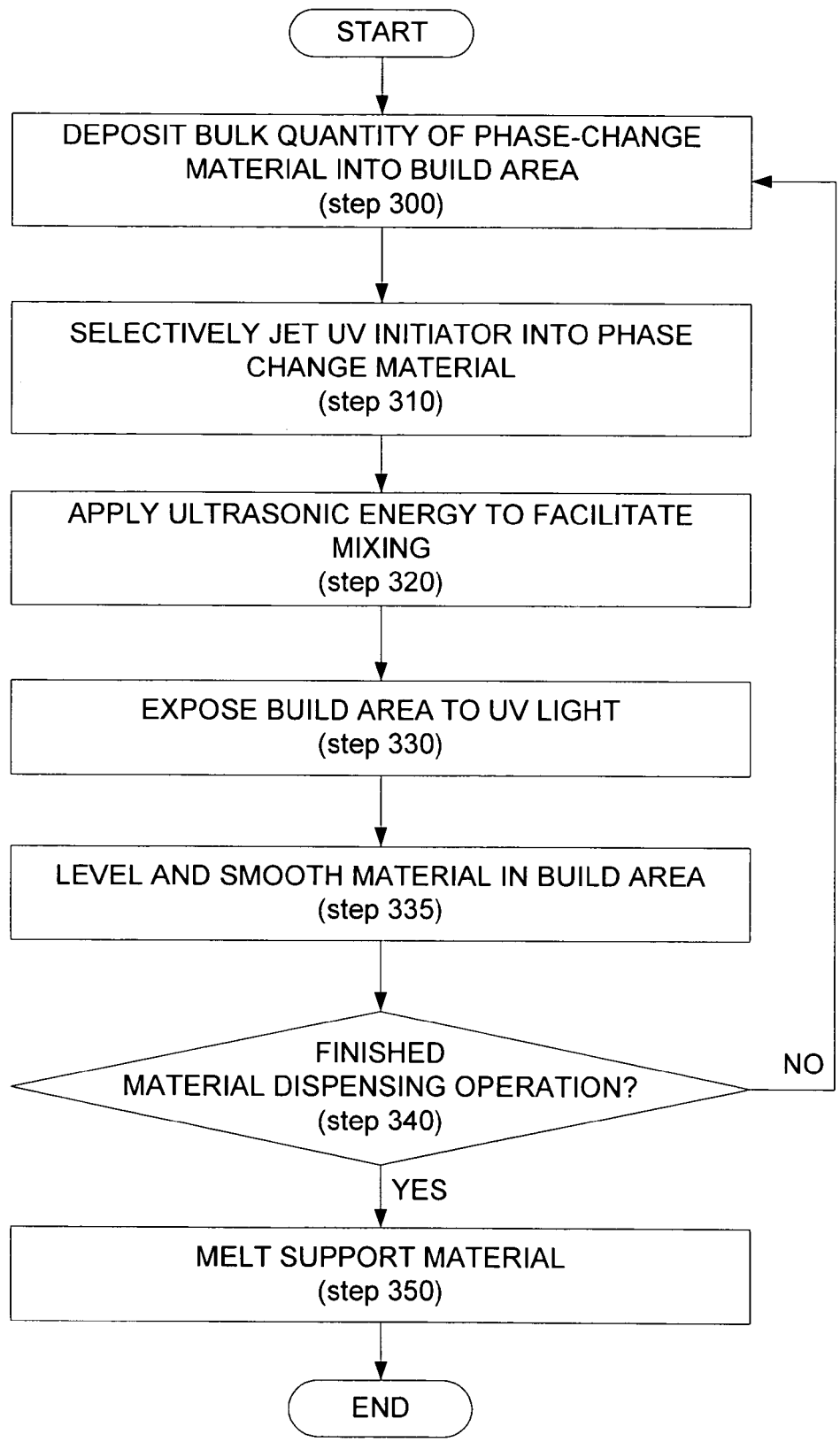
FIG. 3 is a flow chart illustrating a method for forming an SFF object via the bulk spreading a phase-change material according to one exemplary embodiment.

FIG. 3 is a flow chart illustrating an exemplary method for operating the SFF system (100; FIG. 2) illustrated in FIG. 2 incorporating a phase-change material according to one exemplary embodiment. As illustrated in FIG. 3, the present method may begin by depositing a bulk quantity of phase-change material, in a thin layer, onto a build area (step 300). Once the quantity of phase-change material has been deposited as necessary (step 300), the SFF apparatus selectively jets a UV initiator into the newly deposited layer of phase-change material (step 310). When the UV initiator has been jetted into the phase-change material, a burst of ultrasonic energy may optionally be applied to the phase-change material (step 320) to facilitate the mixing of the UV initiator with the phase-change material. With the UV initiator selectively jetted into the phase-change material, the build area is exposed to UV light (step 330). Once exposed, an optional step of leveling and smoothing the material may be performed (step 335) and an operator or a coupled computing device determines whether the material dispensing operation is complete (step 340). If the material dispensing operation is not complete (NO, step 340), the present system and apparatus may again deposit a bulk quantity of phase-change material (step 300) and continue selectively jetting UV initiator into the phase-change material (step 310) until the material dispensing operation is determined to be complete (step 340). Once the material dispensing operation is complete (YES, step 340), the non-cross-linked phase-change material may be melted (step 350) to expose the desired three-dimensional object. Each of the above-mentioned steps of FIG. 3 will now be explained in detail with reference to FIGS. 4A through 4E.

As shown in the flow chart of FIG. 3, one exemplary embodiment of the present method begins by depositing a bulk quantity of phase-change material into a build area (step 300). As mentioned previously, the bulk quantity of phase-change material may be deposited in liquid form by a number of methods including, but in no way limited to, spraying, rolling, screen-printing, extrusion, or doctor-blading. Additionally, the phase-change material may be applied in solid form as a powder or a sheet, and then heated to a liquid form after application. Such heating to a liquid form can be before or after the UV initiator is applied to the material. The applied layer may be further modified before or after solidification through application of spreading and leveling devices, to provide a consistent layer thickness and surface quality. Spreading and leveling devices may for example include milling cutters, scraping blades, heated rollers, or other methods commonly used to flatten and level surfaces.

Figure 4A:
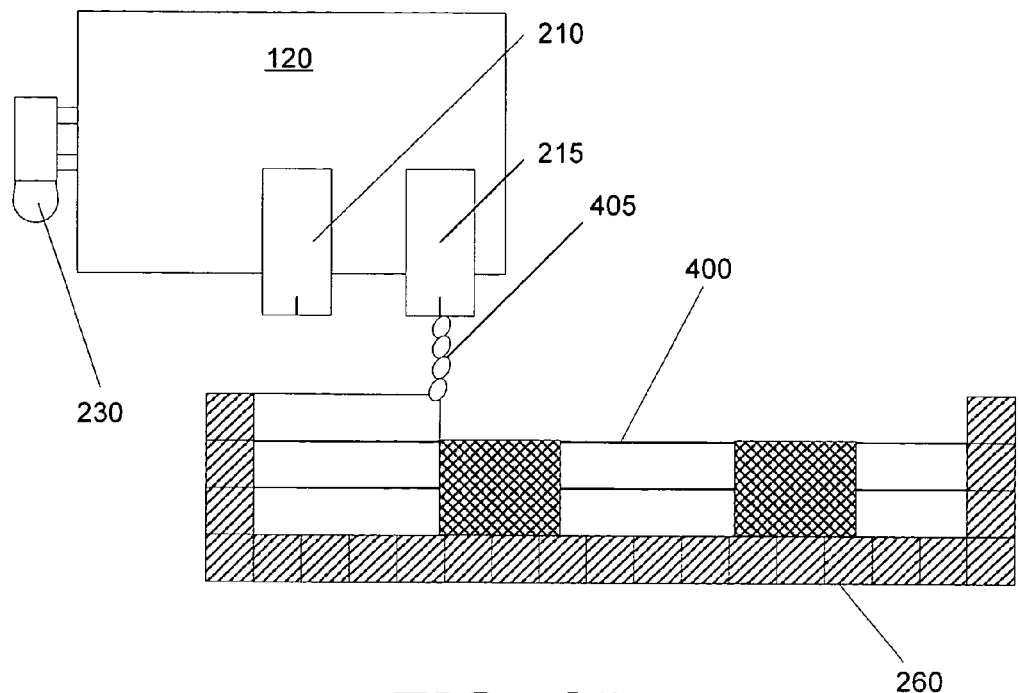
FIG. 4A is a cross-sectional view illustrating the distribution of a liquid phase-change material according to one exemplary embodiment.

FIG. 4A illustrates a phase-change material inkjet dispenser (215) depositing droplets (405) of a bulk quantity of phase-change material (400) onto a substrate (260). According to one exemplary embodiment, one or more phase-change material inkjet dispensers (215) operating according to high volume and low precision parameters dispense bulk quantities of phase-change material. Once deposited, the bulk quantity of phase-change material (400) forms a layer of phase-change material (400) on the substrate (260). The phase-change material (400) may be a predetermined amount supplied from a phase-change material reservoir (not shown). If the phase-change material (400) is forming the first layer of the desired three-dimensional object, the phase-change material (400) is dispensed directly onto the substrate (260). However, if one or more layers of phase-change material (400) have already been deposited, subsequent layers of phase-change material (400) are deposited on and supported by previously processed or deposited layers.

While FIG. 4A illustrates the present phase-change material (400) being dispensed by a phase-change material inkjet dispenser (215), the bulk quantity of phase-change material may be deposited into the build area (step 300) and onto the substrate (260) by any number of rapid non-selective material deposition methods including, but in no way limited to, spraying, rolling, screen-printing, extruding, or doctor-blading. The present system and method facilitates the rapid production of a desired three-dimensional object because the deposition of the phase-change material (400) does not need to be selectively dispensed. Rather, the phase-change material (400) may be deposited in bulk. The amount of phase-change material (400) deposited by the phase-change material inkjet dispenser (215) or other dispensing means may be adjusted by the servo-mechanism (200; FIG. 2) and optimized to correspond to the UV initiator ejection rate of the initiator dispenser (210).

Figure 4B:
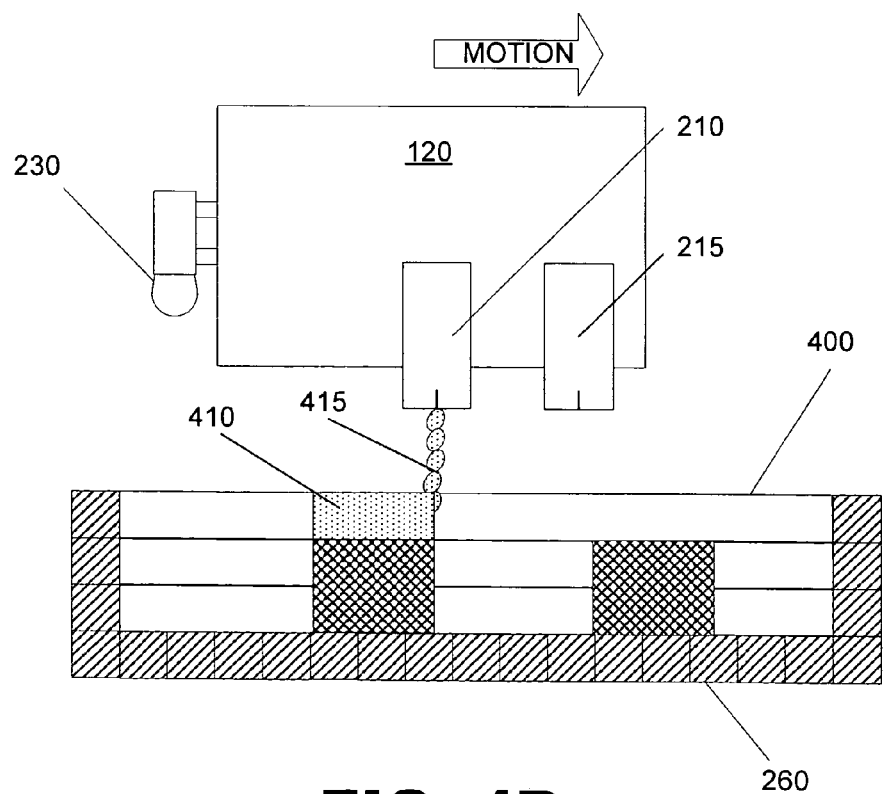
FIG. 4B is a cross-sectional view showing the deposition of a UV initiator according to one exemplary embodiment.

Once a layer of phase-change material (400) has been deposited in bulk (step 300; FIG. 3) as shown in FIG. 4A, the initiator inkjet dispenser (210) may selectively deposit a quantity of UV initiator (step 310) into the phase-change material (400). As shown in FIG. 4B, the moveable carriage (120) and consequently the initiator inkjet dispenser (210) may be controllably positioned adjacent to the phase-change material (400) by the computing device (140; FIG. 2) and the servo-mechanism (200). When in a desired location, as directed for example by a CAD program, the initiator inkjet dispenser (210) is actuated to dispense a pre-determined quantity of the above-mentioned UV initiator (415) into a non-solidified layer of phase-change material (400). The UV initiator (415) may be jetted into portions of the phase-change material (400) defining the entire desired three-dimensional object, or alternatively jetted to form a shell that defines the outer surface of a desired three-dimensional object. According to this exemplary embodiment, the phase-change material (400) shell may be formed defining the outer surface of the desired three-dimensional object and containing sufficient phase-change material (400) to form a solid object. The phase-change material (400) disposed within the shell would then be encapsulated within the shell.

As is shown in FIG. 4B, when the UV initiator (415) is dispensed by the initiator inkjet dispenser (210) onto the layer of phase-change material (400), the UV initiator disperses through and mixes with the phase-change material (400) prior to the hardening of the phase-change material (400). This mixture (410) of UV initiator (415) and phase-change material (400) defines the cross-section of the desired three-dimensional object or its shell. The mixing of the UV initiator (415) into the phase-change material (400) may optionally be facilitated by the application of a burst of ultrasonic energy (step 320; FIG. 3). Similarly, the viscosity of the UV initiator may be decreased by increasing the temperature of the initiator inkjet dispenser (210). The ability to control the temperature of the initiator inkjet dispenser (210) allows for the incorporation of more viscous higher molecular weight fluids, which can provide for more desirable mechanical properties of the resulting three-dimensional object. However, the temperature of the inkjet dispenser (210) should not exceed the vaporization temperature, decomposition temperature, or thermal activation temperature of the initiator.

When sufficient UV initiator (415) has been deposited on a layer of phase-change material (400) to cover a designated portion of the phase-change material, the moveable carriage (120) is translated to selectively deposit additional UV initiator onto other areas of the phase-change material as indicated by the "motion" arrow. While the exemplary embodiment of the present method illustrated in FIG. 3 through FIG. 6D show the UV initiator (415) being deposited after the deposition of a layer of phase-change material (400), the application of UV initiator may also occur prior to or simultaneously with the continued application of phase-change material (400) in a different portion of the build area.

Figure 4C:
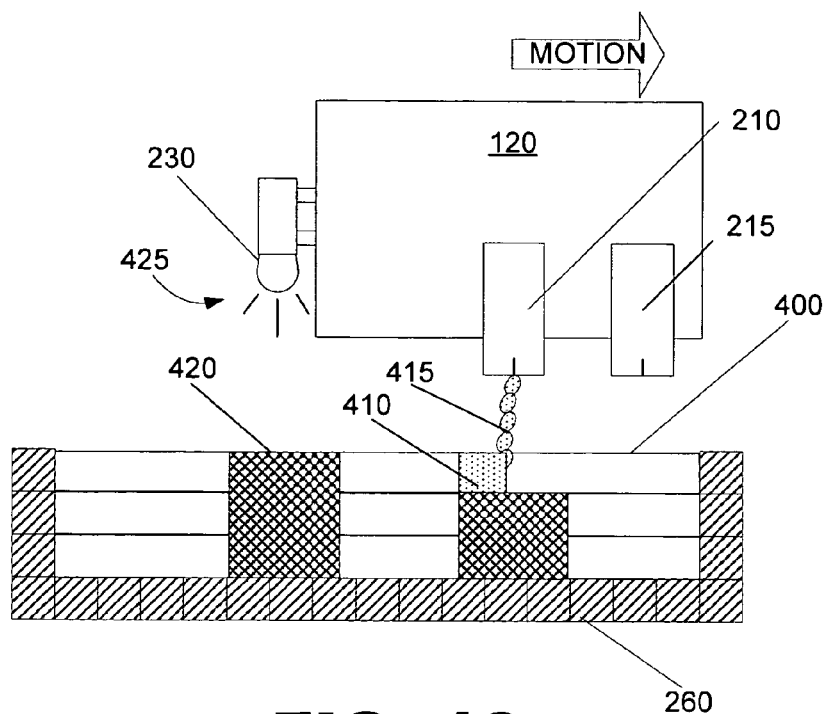
FIG. 4C is a cross-sectional view illustrating the application of ultraviolet (UV) rays to the phase-change material according to one exemplary embodiment.

Once the mixture (410) of UV initiator (415) and phase-change material (400) has been sufficiently "mixed," the phase-change material (400) may be exposed to UV light (step 330; FIG. 3) as shown in FIG. 4C. Once exposed to UV light (425), the mixture (410) begins to crosslink (420) thereby setting the shape of the desired three-dimensional object through covalent bonds. The UV light (425) may be provided to the mixture (410) of UV initiator (415) and phase-change material (400), according to one exemplary embodiment, by a UV radiation applicator (230) acting as a scanning unit physically coupled to the moveable carriage (120). Alternatively, the UV light (425) may be provided by a radiation applicator (230) in the form of a separate light exposer or scanning unit configured to flood expose all or selective portions of the deposited phase-change material after a UV initiator (415) has been deposited.

When the mixture (410) of UV initiator (415) and phase-change material (400) is exposed to the UV light (425), the UV initiator (415) utilizes energy from the UV radiation to produce a free radical. The free radical then facilitates cross-linking of the phase-change material and UV initiator mixture (410). Generally speaking, cross-linking of the phase-change material will impart hardness, strength, stiffness, and improved dimensional stability to the material. Portions of the phase-change material (400) that are not mixed with the UV initiator (415) are not affected by the application of UV light (425) and do not cross-link. However, these portions of phase-change material (400) remain in their solidified state and serve as a support structure for the cross-linked material (420) that forms the desired three-dimensional object as shown in FIG. 4C.

After the application of UV light (425), the completed layer of material may optionally be mechanically leveled and smoothed through use of such mechanisms as rollers, milling cutters, scraping blades, or other known methods of surface smoothing. The mechanical leveling of the material aids in the adhesion and dimensional accuracy of the subsequent layer of material.

Once a layer of the mixture (410) of UV initiator (415) and phase-change material (400) have been sufficiently "mixed," exposed to UV light to form a cross-linked material (420), and optionally leveled, the computing device (140; FIG. 2) or a system operator will determine whether the solid free-form fabrication system (100; FIG. 2) has finished the material dispensing operation (step 340; FIG. 3) defining a desired three-dimensional object. If the requisite layers of phase-change material (400) and UV initiator (415) have been dispensed and exposed to construct the desired three-dimensional object, the computing device (140; FIG. 2) or system operator will determine that the material dispensing operation is complete (YES, step 340; FIG. 3) and the solid free-form fabrication system (100; FIG. 2) will end its material dispensing operation. If, however, the computing device determines that the entire three-dimensional object has not been formed (NO, step 340; FIG. 3), the solid free-form fabrication system (100; FIG. 2) deposits another bulk layer of phase-change material (step 300) and the process begins again.

Figure 4D:
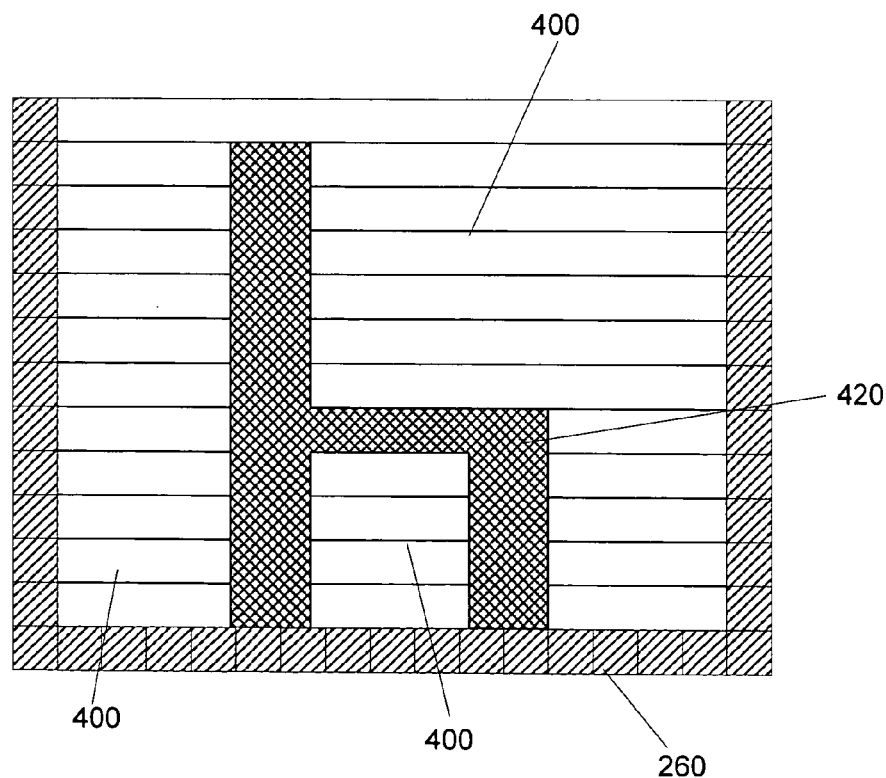
FIG. 4D is a cross-sectional view illustrating a cross-linked object formed by the present method surrounded by non-cross-linked phase-change material according to one exemplary embodiment.

FIG. 4D illustrates a substrate (260) containing a desired three-dimensional object formed of cross-linked material (420). As shown in FIG. 4D, a completed three-dimensional object formed by the present system and method will be constructed of cross-linked material (420). The cross-linked material (420) will be surrounded by and supported by a non-cross-linked phase-change material (400).

Figure 4E:
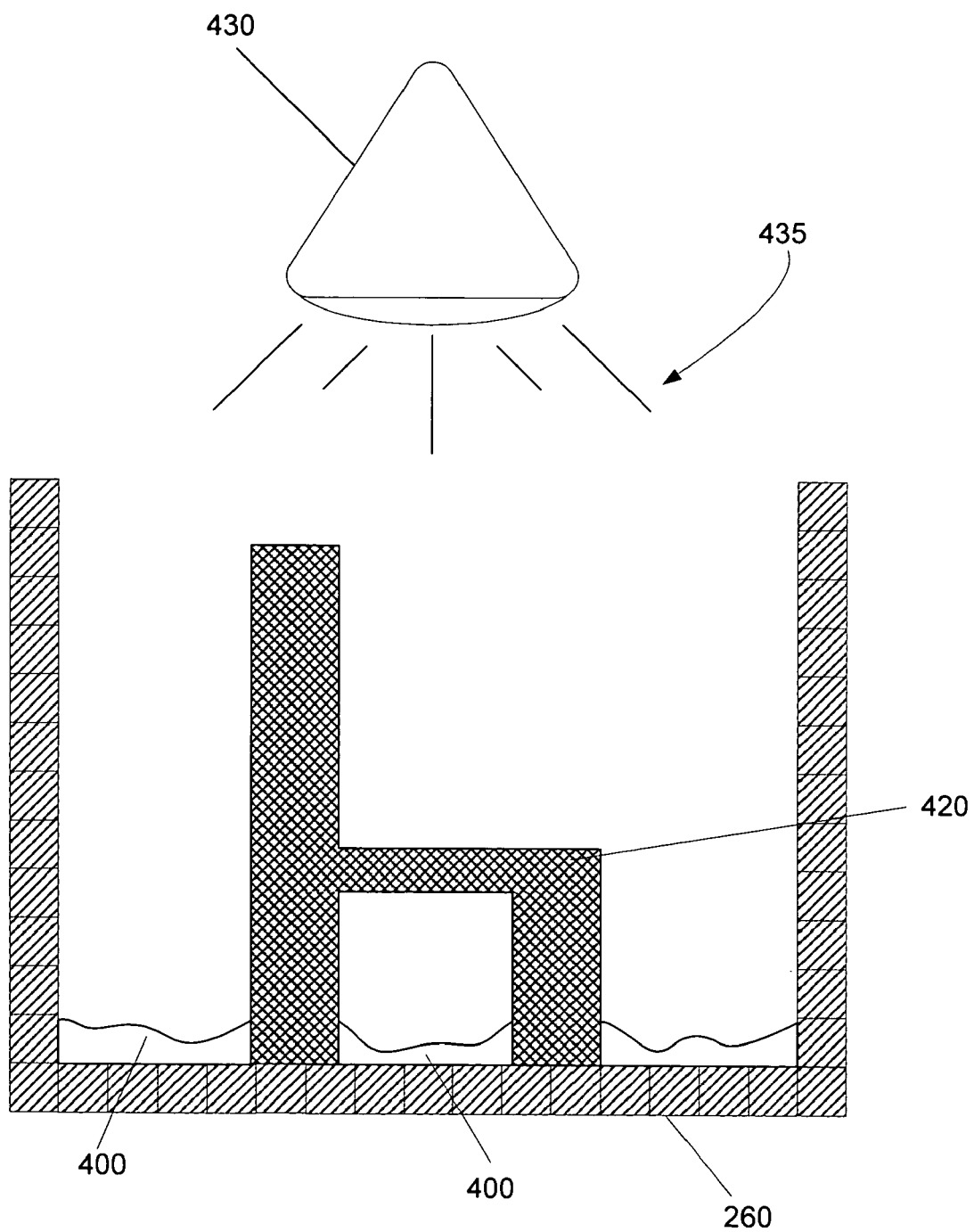
FIG. 4E is a cross-sectional view illustrating the removal of non-cross-linked phase-change material from a cross-linked object according to one exemplary embodiment.

Once the material dispensing operation has been completed (YES, step 340; FIG. 3), the desired three-dimensional object constructed of cross-linked material (420) is removed from the supporting non-cross-linked phase-change material (step 350; FIG. 3). FIG. 4E illustrates the removal of the desired three-dimensional object from the non-cross-linked phase-change material (400) according to one exemplary embodiment. As shown in FIG. 4E, the non-cross-linked phase-change material (400) may be removed from the formed three-dimensional part by applying thermal energy (435) to the phase-change material (400). As shown in FIG. 4E, when sufficient thermal energy (435) is applied to the non-cross-linked phase-change material (400), it begins to liquefy and melt. Once the non-cross-linked material is liquefied or melted, the cross-linked material (420) forming the desired three-dimensional object may be easily removed or otherwise separated from the other materials. The thermal energy (435) may be provided by any number of sources and should be provided in a quantity sufficient to melt the non-cross-linked phase-change material (400) without burning or charring the cross-linked material (420). While the exemplary embodiment illustrated in FIG. 4E shows removal of the phase-change material (400) from the cross-linked material (420) through the application of thermal energy (435) by a thermal applicator (430), the different physical properties exhibited by the phase-change material (400) and the cross-linked material (420) allow for separation of the two materials by any number of mechanical or chemical methods. The separation of the cross-linked material (420) from the phase-change material (400) may occur either within the SFF system (100; FIG. 2) or in another location.

Alternative Embodiments

Figure 5:
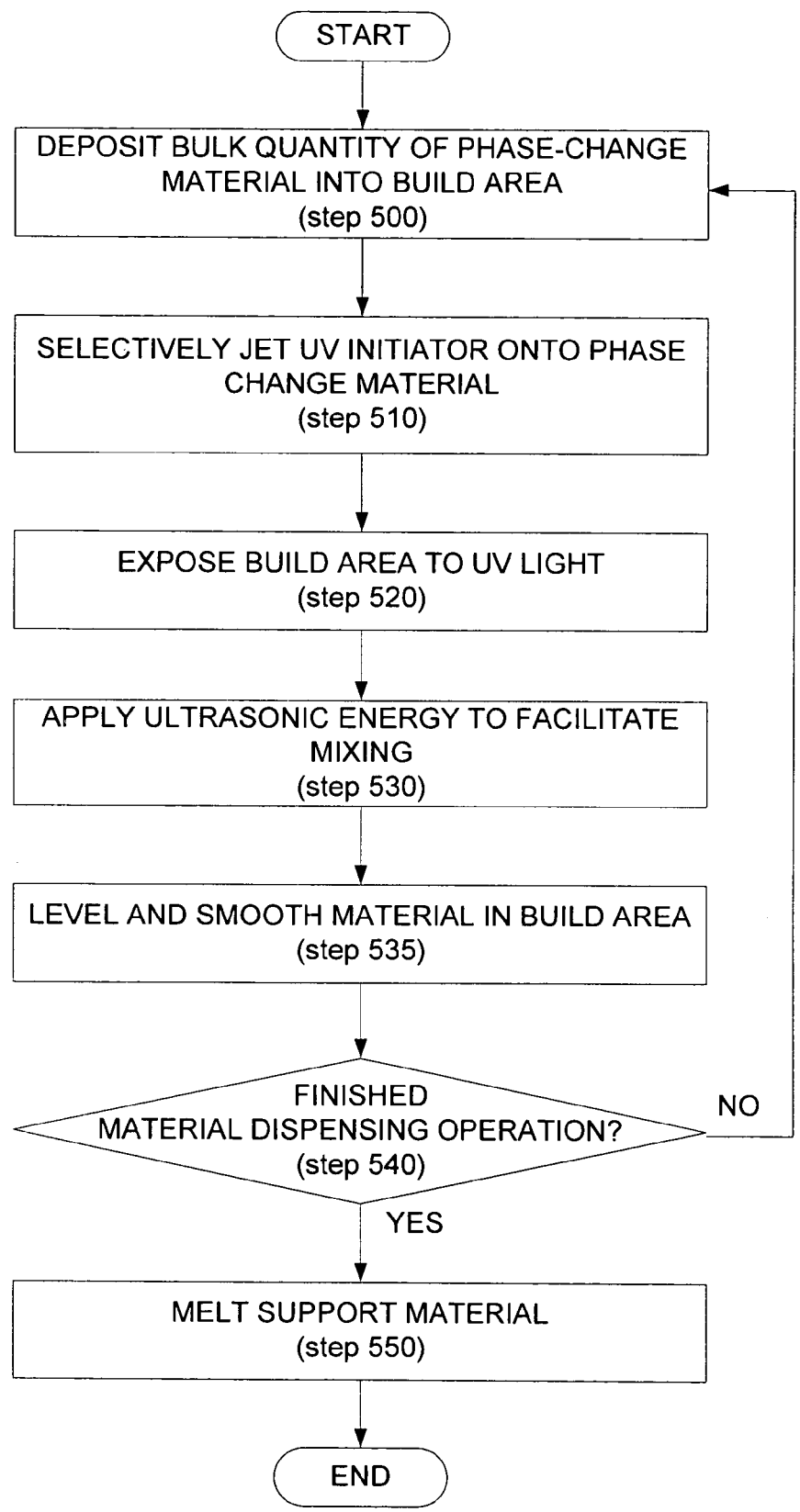
FIG. 5 is a flow chart illustrating a method for performing the present method of bulk spreading a phase-change material according to one exemplary embodiment.

FIG. 5 is a flow chart illustrating an alternative method for forming a desired three-dimensional object via the bulk spreading of a phase-change material. According to the exemplary embodiment illustrated in FIG. 5, the alternative method may begin by depositing a bulk quantity of phase-change material into a build area (step 500). Once the phase-change material has cooled to a solidification temperature, a UV initiator may be selectively jetted onto the phase-change material (step 510). Once the UV initiator is jetted onto the phase-change material, the build area may be exposed to UV light (step 520) sufficient to re-liquefy the surface layer of phase-change material. This UV light and an optional burst of ultrasonic energy (step 530) may facilitate the diffusion of the UV initiator into the phase-change material as well as the subsequent cross-linking of the mixture. Once the phase-change material and the UV initiator are mixed and cross-linked, an optional leveling or smoothing operation may be performed (step 535) and then it is determined whether the material dispensing operation is complete (step 540). If the material dispensing operation is complete (YES, step 540), non-cross-linked support material may be removed through melting (step 550) and the desired three-dimensional part may be removed. If, however, the material dispensing operation is not complete (NO, step 540), another bulk quantity of phase-change material is deposited in the build area (step 500) and the above-mentioned process begins again. The present alternative method for forming a desired three-dimensional object via bulk spreading of a phase-change material will now be described in further detail with reference to FIG. 6A through FIG. 6D.

Figure 6A:
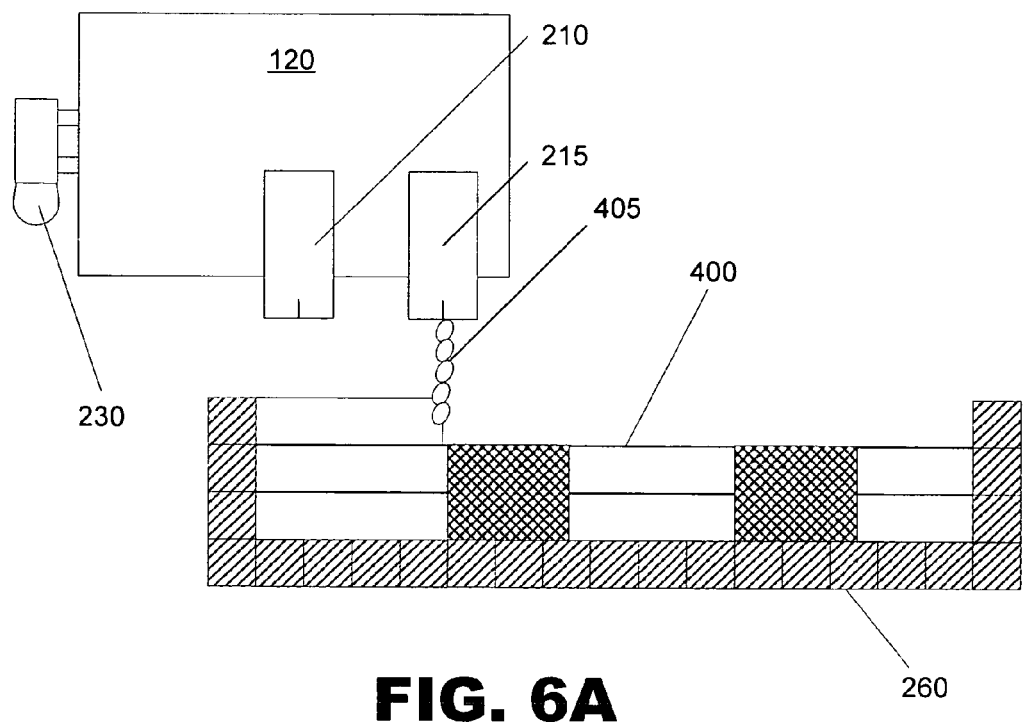
FIG. 6A is a cross-sectional view illustrating the distribution of a liquid phase-change material according to one exemplary embodiment.

As shown in FIG. 6A, the present alternative method begins by depositing a bulk quantity of phase-change material (400) into a build area (step 500; FIG. 5). As noted above with reference to FIG. 4A, the bulk quantity of phase-change material may be deposited into the build area (step 500; FIG. 5) and onto the substrate (260) by any number of rapid non-selective material deposition methods including, but in no way limited to, spraying, rolling, screen-printing, or doctor-blading. The rapid non-selective deposition of the phase-change material facilitates the rapid production of a desired three-dimensional object.

Figure 6B:
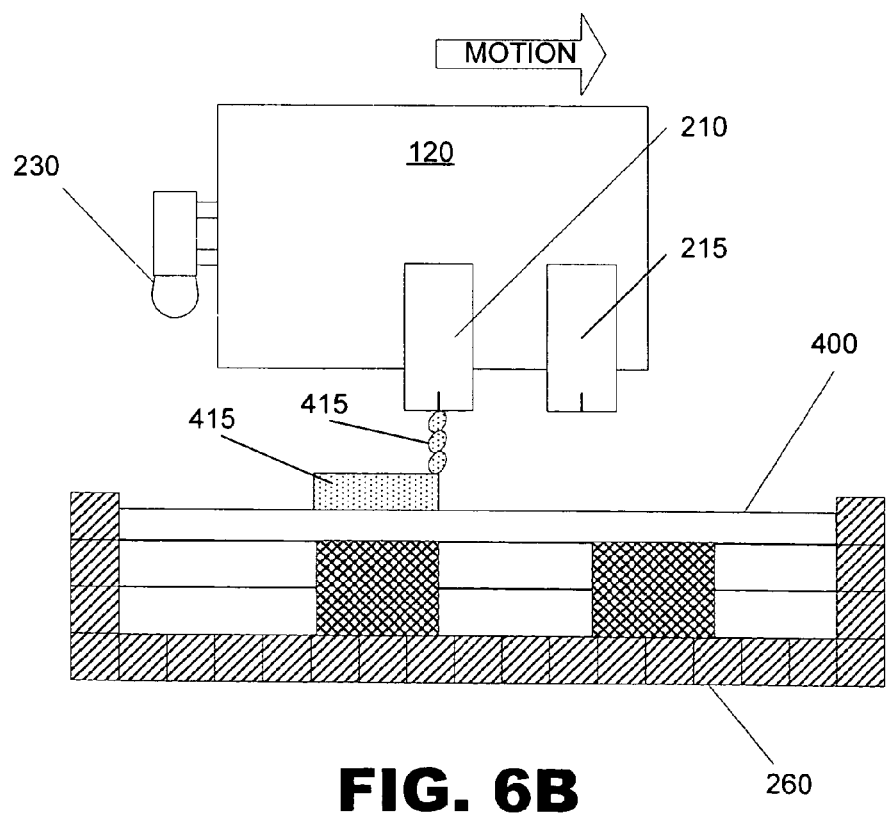
FIG. 6B is a cross-sectional view showing the deposition of a UV initiator according to one exemplary embodiment.

Once a layer of phase-change material (400) has been deposited on the substrate (260), it is allowed to cool to a solidification temperature. Because the phase-change material (400) is deposited in relatively thin layers, cooling to a solidification temperature will be relatively rapid. Once the phase-change material (400) is cooled and solidified, a UV initiator may be selectively jetted onto the solidified phase-change material (step 510; FIG. 5) in a pattern defining a three-dimensional object. As shown in FIG. 6B, the UV initiator (415), once deposited, will remain on top of and remain unabsorbed by the solidified phase-change material (400).

Figure 6C:
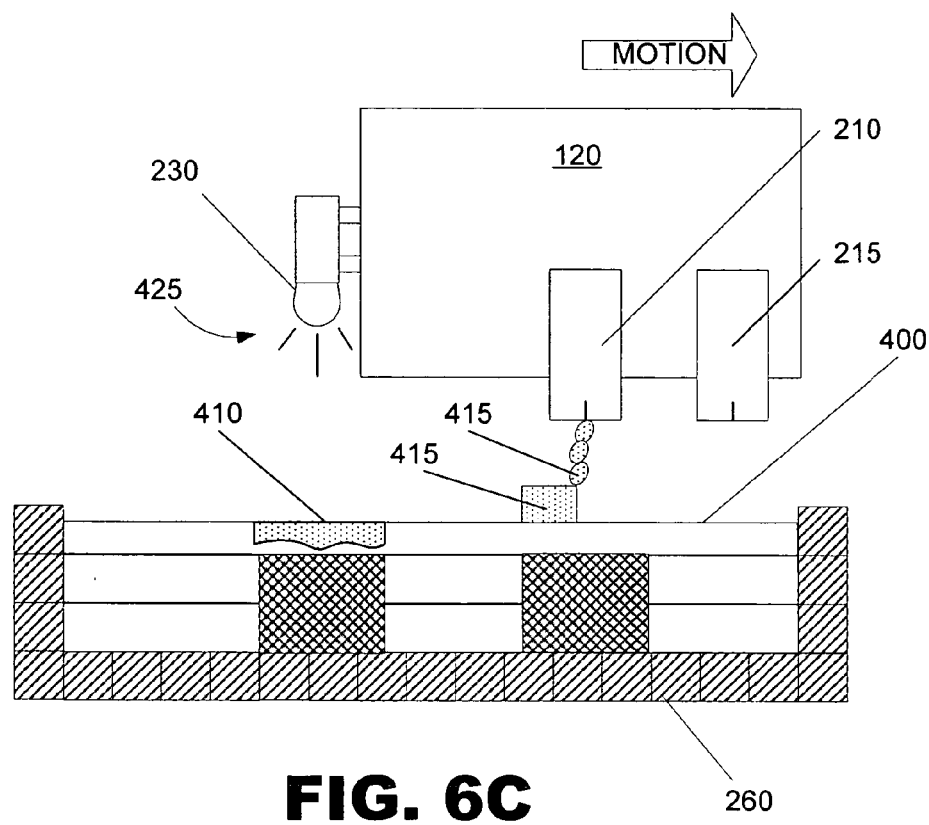
FIG. 6C is a cross-sectional view illustrating an alternative method for mixing the UV initiator according to one exemplary embodiment.

With the unabsorbed UV initiator (415) on top of the phase-change material (400), the build area may be exposed to UV light (step 520; FIG. 5) sufficient to re-liquefy the phase-change material (400). FIG. 6C illustrates the application of UV light according to the present exemplary embodiment. As shown in FIG. 6C, the UV light (425) is directed to the UV initiator (415) and the phase-change material (400) in sufficient intensity to re-liquefy the phase-change material (400) thereby allowing the UV initiator (415) to diffuse into the layer of phase-change material (400) forming a mixture (410). The intensity of the UV light (425) and optionally some level of infrared radiation (IR) may vary depending on the type of phase-change material (400) used. The diffusion of the UV initiator (415) may also be further facilitated by the application of a brief pulse of ultrasonic vibration, if desired (step 530; FIG. 5). However, the application of UV light (step 520; FIG. 5) may be applied simultaneous with or again after the optional mixing is complete to further cross-link the material.

Figure 6D:
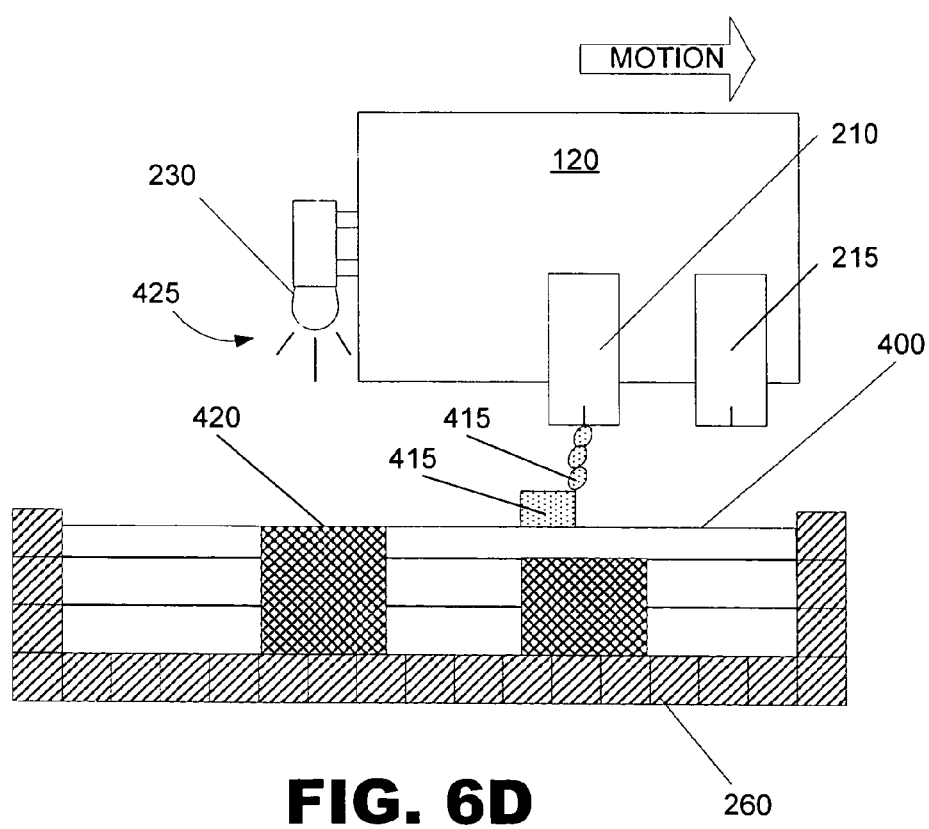
FIG. 6D is a cross-sectional view illustrating the cross-linking of a phase-change material according to one exemplary embodiment.

As shown in FIG. 6D, the UV light (425), in addition to causing the phase-change material to re-liquefy, causes the UV initiator (415) to form a free radical and cause the phase-change material (400) to selectively cross-link forming a cross-linked material (420). The cross-linked material (420) will have increased hardness, strength, stiffness, and dimensional stability when compared to the un-cross-linked phase-change material. Additionally, portions of phase-change material (400) that are not cross-linked cool to their solidified state and serve as a support structure for the cross-linked material (420) that forms the desired three-dimensional object as shown in FIG. 6D.

Once a layer of phase-change material has been cross-linked, the present exemplary embodiment may perform an optional leveling operation (step 535; FIG. 5) as described above with regards to FIG. 3. Once completed, the present exemplary embodiment determines if the material dispensing operation is complete (step 540; FIG. 5). If complete (YES, step 540; FIG. 5), the supporting phase-change material is melted away leaving the desired three-dimensional object. If, however, the material dispensing operation is not complete (NO, step 540; FIG. 5), the system again deposits a bulk quantity of phase-change material into the build area and allows it to cool to a solidification temperature in preparation of forming another layer of the desired three-dimensional object according to the above-mentioned method.

Figure 7:
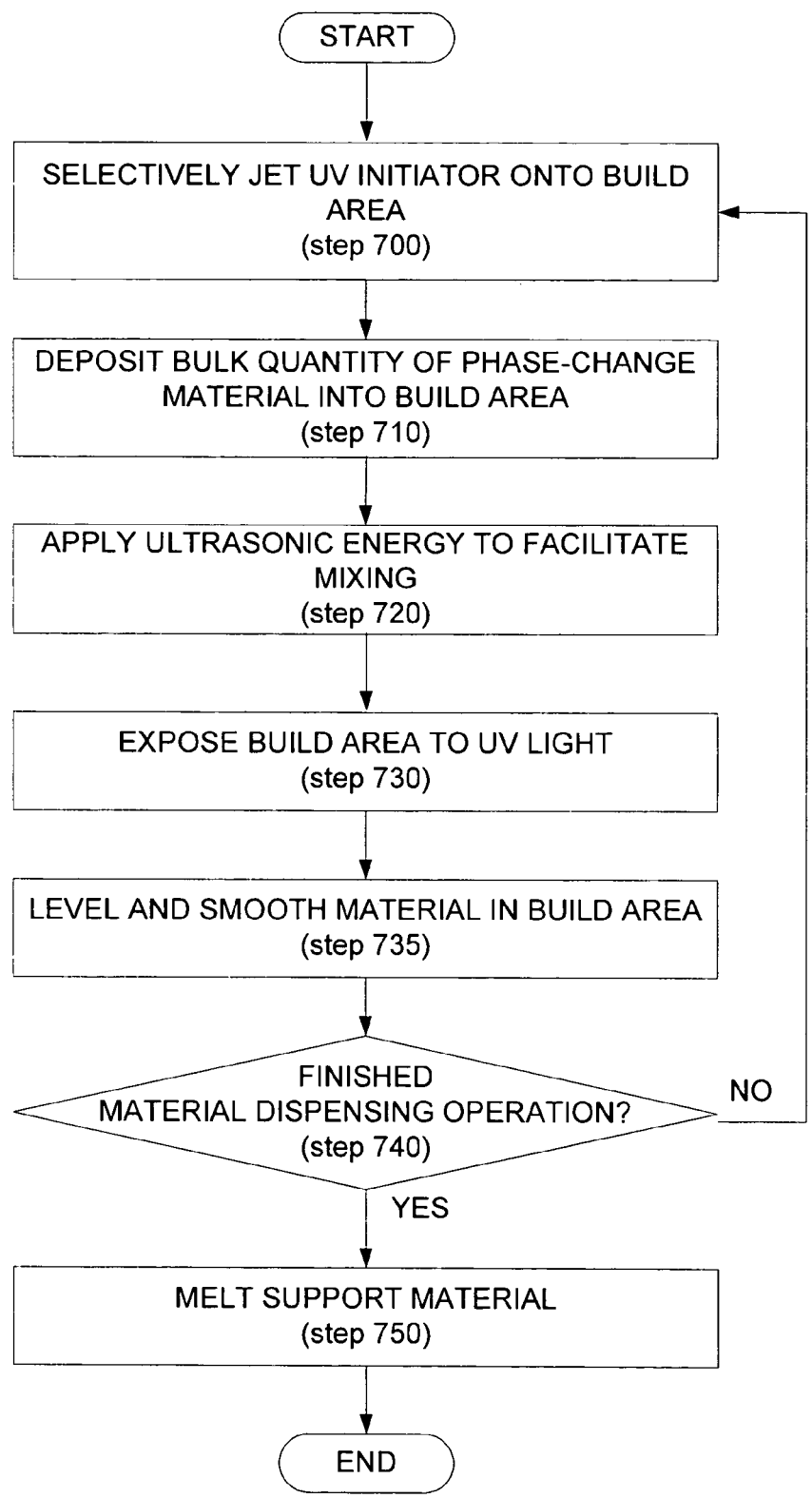
FIG. 7 is a flow chart illustrating an alternative method for performing the present method of bulk spreading a phase-change material according to one exemplary embodiment.

FIG. 7 illustrates yet another alternative method for forming a desired three-dimensional object via the bulk spreading of a phase-change material. According to the exemplary embodiment illustrated in FIG. 7, the method may begin by first selectively jetting a UV initiator onto a build area (step 700). The UV initiator may be selectively jetted directly onto the substrate (260; FIG. 4D) if no layers of phase-change material have been deposited, or onto a previously formed layer of phase-change material.

Once the UV initiator is jetted, a bulk quantity of phase-change material may be dispensed into the build area (step 710) according to any of the above-mentioned methods including, but in no way limited to, spreading a liquid phase-change material with one or more inkjet material dispensers operating according to high volume and low precision parameters, spreading a liquid phase-change material with a roller or other dispenser, or spreading a powder phase-change material with a blade or a roller. If a powder phase-change material is dispensed, a quantity of thermal energy may be supplied to the powder sufficient to liquefy it (not shown) before or after the UV initiator is applied.

Once the liquid phase-change material comes into contact with the deposited UV initiator, the two materials combine to form a mixture. Combination of the two materials may be enhanced by the optional application of ultrasonic energy (step 720). Once the UV initiator and the phase-change material are combined, the build area may be exposed to UV energy to facilitate selective cross-linking of the phase-change material (step 730). Application of the UV energy may be performed as explained previously by a UV radiation applicator (230; FIG. 4C) acting as a scanning unit physically coupled to the moveable carriage (120; FIG. 4C), by a radiation applicator (230; FIG. 4C) in the form of a separate light exposer or scanning unit configured to flood expose all or selective portions of the build area.

Once exposed, the surface of the deposited material may then be leveled after the cross-linking process, to provide a consistent dimension and surface for application of the next layer of material (step 735). When the deposited material has been leveled, a system operator or coupled computing device determines whether the desired three-dimensional object has been formed (step 740). As explained above in previous exemplary embodiments, if the desired three-dimensional object has not been formed (NO, step 740), UV initiator is once again selectively deposited onto the build area (step 700). If, however, the desired three-dimensional object has been formed (YES, step 740), the non-cross-linked support material may be melted away and the desired three-dimensional object may be removed (step 750) as described above.

The present exemplary method may allow for better mixing of the UV initiator with the bulk phase-change material. By depositing the UV initiator onto the build area first, it may immediately be mixed with the liquefied phase-change material.

In conclusion, the present system and method for producing three-dimensional objects through the bulk spreading of a phase-change material reduces production time by eliminating the need to apply the build and support material with dispensers operating according to high-precision parameters. By bulk-spreading the base material and only selectively jetting the UV initiator, the present system and method will operate much faster. The production time will also be enhanced due to the fact that the volume of initiator in a UV-curable polymer system is typically only a small fraction of the overall polymer build material volume.

Additionally, the present system and method includes a meltable support material to support the formed three-dimensional object. Utilization of a meltable support material facilitates the automation of system part cleanup. Additionally, the meltable support material may be recycled for use in future build operations, thereby reducing operation costs and wasted materials.

Moreover, the present system and method readily lends itself to the creation of three-dimensional objects having various colors. By adding a dye or other colorant to the UV initiator, the resulting object may include materials made of various selectively applied colors.

The present system and method also produce a dense three-dimensional object with a smooth surface finish. Because both the build and support materials are dispensed in liquid form, very little porosity is produced when solidification occurs.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for solid free-form fabrication of a three-dimensional object, comprising:
   depositing a bulk amount of phase-change material in a defined region;
   selectively ink-jetting an ultraviolet initiator onto a pre-determined area of said defined region, wherein said ultraviolet initiator defines a cross-sectional area of said three-dimensional object;
   applying ultrasonic energy to said phase-change material, wherein said ultrasonic energy is configured to facilitate a mixing of said phase-change material and said ultraviolet initiator; and
   exposing said ultraviolet initiator to an ultraviolet light to facilitate cross-linking of said phase-change material according to said predetermined area.

2. The method of claim 1, wherein the depositing a bulk amount of phase-change material step is performed after the selectively ink-jetting an ultraviolet initiator step for each layer of said three-dimensional object.

3. The method of claim 1, wherein said depositing a bulk amount of phase-change material comprises depositing a pre-determined quantity of phase-change material with one of a print head operating in a low precision condition, a bulk spraying apparatus, a roller, a screen-printing device, or a doctor-blade device.

4. The method of claim 1, wherein said selectively ink-jetting an ultraviolet initiator comprises controllably jetting said ultraviolet initiator to predetermined locations of said defined region.

5. The method of claim 4, wherein said ultraviolet initiator is controllably jetted into a non-solid phase-change material.

6. The method of claim 4, wherein said ultraviolet initiator is controllably jetted on top of a solidified phase-change material.

7. The method of claim 6, wherein said ultraviolet light is configured to re-liquefy a surface layer of said phase-change material.

8. The method of claim 7, wherein said ultraviolet light further comprises infrared radiation.

9. The method of claim 4, wherein said ultraviolet initiator is controllably jetted by one of a thermally actuated inkjet dispenser, a mechanically actuated inkjet dispenser, an electrostatically actuated inkjet dispenser, a magnetically actuated inkjet dispenser, a piezoelectrically actuated inkjet dispenser, or a continuous inkjet dispenser.

10. The method of claim 1, wherein said ultraviolet light is provided by one of a scanning unit or a flood exposer.

11. The method of claim 1, further comprising removing a non-cross-linked phase-change material from said cross-linked phase-change material.

12. The method of claim 11, wherein said non-cross-linked phase-changed material is removed from said cross-linked phase-change material by the application of a thermal energy.

13. The method of claim 1, wherein said phase-change material comprises one of an unsaturated monomer containing at least one unsaturated functionality or an oligomer containing at least one unsaturated functionality.

14. The method of claim 1, wherein said phase-change material comprises one of a stearyl acrylate, a cyclohexane dimethanol dimethacrylate, a cyclohexane dimethanol diacrylate, or a tris(2-hydroxy ethyl) isocyanurate triacrylate.

15. The method of claim 13, wherein said phase-change material comprises a high melting unsaturated monomer or oligomer combined and plasticized with an unsaturated monomer or oligomer having a lower than ambient melting temperature.

16. The method of claim 15, wherein said unsaturated monomer or oligomer having a lower than ambient melting temperature comprises one of an isodecyl methacrylate, a 2-phenoxyethyl acrylate, an isobornyl acrylate, a propylene glycol monomethacrylate, a propylene glycol dimethacrylate, an ethylene glycol dimethacrylate, a 1,6-hexanediol dimethacrylate, a urethane acxylate, or an epoxy acrylate.

17. The method of claim 1, wherein said ultraviolet initiator comprises one of an aromatic ketone or a hydroxyl ketone.

18. The method of claim 17, wherein said ultraviolet initiator comprises one of a, benzyl dimethyl ketal, a benzoin n-butyl ether, a trimethyl benzophenone, a benzophenone, or an alpha hydroxy ketone.

19. The method of claim 1, wherein said phase-change material comprises a polymerizable epoxy functionality; and said ultraviolet initiator comprises a jettable cationic photoinitiator.

20. The method of claim 19, wherein said jettable cationic photoinitiator comprises a solution of one of a triaryl sulfonium hexafluoroantimonate, a triaryl sulfonium hexafluorophosphate, or diaryl iodonium hexafluorophosphate.

21. The method of claim 1, wherein said ultraviolet initiator comprises a photoinitiator synergist.

22. The method of claim 1, wherein said ultraviolet initiator comprises one of a dye or a colorant.

23. The method of claim 1, wherein said ultraviolet initiator is deposited prior to said each depositing of a bulk amount of phase-change material.

24. The method of claim 1, wherein said phase change material comprises one of a solid or a liquid when deposited.

25. The method of claim 23, wherein said phase change material is a solid when deposited.

26. The method of claim 25, wherein said solid phase change material is a powder or a sheet.

27. The method of claim 26, further comprising heating the solid phase change material to a liquid form either before or after the step of ink-jetting the ultraviolet initiator.

28. A method for solid free-form fabrication of a three-dimensional object, comprising:
depositing a layer of phase-change material:
selectively applying an ultraviolet initiator in a predetermined pattern to said phase-change material, wherein said pattern of said ultraviolet initiator defines a cross-section of said three-dimensional object; and
exposing said ultraviolet initiator to an ultraviolet light to cross-link said phase-change material in said predetermined pattern;
wherein said phase-change material, after being deposited, is in a solid phase, said method further comprising liquefying said phase-change material; and
wherein said phase-change material is applied in a liquid phase and then solidified, said ultraviolet initiator is then applied to said phase-change material, said phase-change material is then re-liquefied and permeated by said ultraviolet initiator.

29. A method for solid free-form fabrication of a three-dimensional object, layer by layer, said method comprising;
for each layer formed,
first selectively ink-jetting an ultraviolet initiator in a pattern that defines a cross-sectional area of said three-dimensional object;
then, depositing a bulk amount of phase-change material in a defined region, over said ultraviolet initiator;
exposing said ultraviolet initiator to an ultraviolet light to facilitate cross-linking of said phase-change material; and
applying ultrasonic energy to said phase-change material, wherein said ultrasonic energy is configured to facilitate a mixing of said phase-change material and said ultraviolet initiator.

* * * * *

UNITED STATES PATENT AND TRADEMARK OFFICE
CERTIFICATE OF CORRECTION

PATENT NO. : 7,329,379 B2  
APPLICATION NO. : 10/701885  
DATED : February 12, 2008  
INVENTOR(S) : Melissa D. Boyd et al.

It is certified that error appears in the above-identified patent and that said Letters Patent is hereby corrected as shown below:

On the face page, in field (73), under "Assignee", in column 1, line 2, delete "LP." and insert -- L.P. --, therefor.

In column 14, line 58, in Claim 16, delete "acxylate" and insert -- acrylate --, therefor.

In column 14, line 63, in Claim 18, after "of a" delete ",".

In column 15, line 25, in Claim 28, after "material" delete ":" and insert -- ; --, therefor.

In column 16, line 13, in Claim 29, after "comprising" delete ";" and insert -- : --, therefor.

In column 16, line 19, in Claim 29, after "region" delete ",".

Signed and Sealed this

Third Day of June, 2008

JON W. DUDAS  
*Director of the United States Patent and Trademark Office*